May 7, 1963  F. K. H. NALLINGER  3,088,432
MEASURING DEVICE, ESPECIALLY SPEED
INDICATOR FOR MOTOR VEHICLES
Filed Oct. 17, 1960
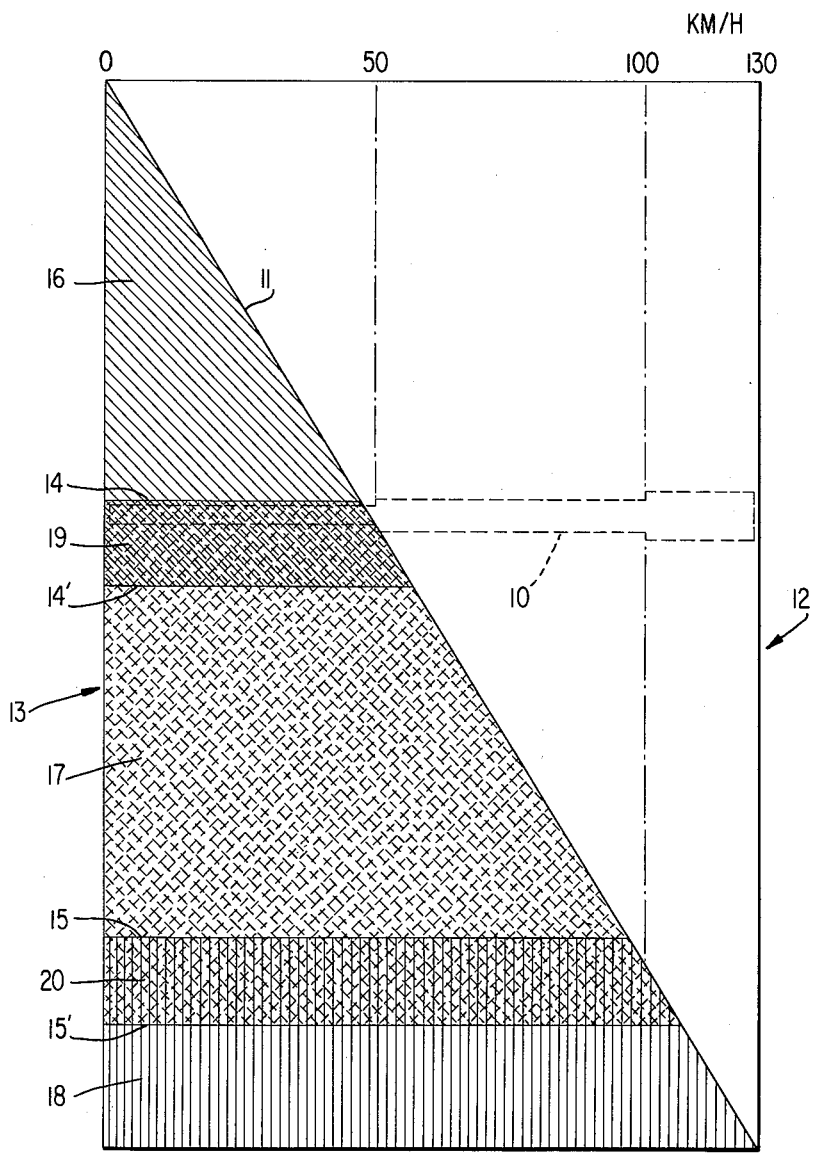
INVENTOR
FRIEDRICH K. H. NALLINGER
BY *Dicke, Craig & Freudenberg*
ATTORNEYS

United States Patent Office 3,088,432
Patented May 7, 1963

3,088,432
MEASURING DEVICE, ESPECIALLY SPEED INDICATOR FOR MOTOR VEHICLES
Friedrich K. H. Nallinger, Stuttgart, Germany, assignor to Daimler-Benz Aktiengesellschaft, Stuttgart-Unterturkheim, Germany
Filed Oct. 17, 1960, Ser. No. 63,944
Claims priority, application Germany Oct. 20, 1959
10 Claims. (Cl. 116—116)

The present invention relates to an indicator for a measuring instrument, especially to a speed indicator for motor vehicles provided with an elongated indicator window arranged at least approximately vertically or horizontally and with an indicator mark which moves in the longitudinal direction of the indicator window and which has different colors for the different indicating ranges thereof, for example, for the speed ranges of between 0 to 50 kilometers per hour, 50 to 100 kilometers per hour, etc., as more fully disclosed in my copending application S. N. 6402, filed on February 3, 1960, and entitled "Measuring Instruments Especially Speedometer for Motor Vehicles," the subject matter of which is incorporated herein by reference insofar as necessary.

A measuring instrument of the general type described hereinabove has been disclosed in my aforementioned copending application. In the measuring instrument disclosed therein, a roller member is provided having an axis of rotation essentially parallel to the plane of an associated indicator window. The roller member is divided into a series of colored zones forming an indicator mark corresponding to the speed of the vehicle. The color of the indicator mark changes during the transition from one to the next indicator range over the entire length thereof. The indicator mark of the aforementioned application is, for example, green over the entire length thereof within a speed range of 0 to 50 kilometers per hour. During the transition to the next indicator range, for example, into the indicator range of 50 to 100 kilometers per hour, the entire indicator mark changes its color, i.e., from the zero value to the indicated speed thereof and becomes, for instance, orange.

The present invention relates to an improvement of the measuring device disclosed in the aforementioned copending application. This improvement is achieved by the fact that a transitional color zone or color field is arranged between the color fields or zones for the indicator ranges whereby the size of the transitional field or zone corresponds to the permissive range of tolerance, for example, to a transgression or excess of speed by 10%.

A solution is preferred in accordance with the present invention for a speedometer or speed indicating device in motor vehicles according to which the transitional color field extends only on one side thereof, i.e., only above the limit of the indicating range. This is so because in that case only an exceeding of a predetermined measured value, i.e., of a predetermined speed limit has to be watched for whereas falling below this speed limit is ordinarily of no concern. Of course, the reverse case is also feasible, according to the present invention, for example, if certain lower limits or predetermined measured values are not to be transgressed. Additionally, the transitional color field may extend on both sides of the limit so that the maintenance of a predetermined intended value within a tolerance range extending above and below the intended value can be readily supervised.

The measuring instrument according to the present invention enables the person observing the same to recognize more readily and more rapidly whether the measured value is maintained or falls within the permissive tolerance range of the respective intended value, for example, within the speed limit of 50 kilometers per hour which is to be observed carefully. The indicator mark of the instrument, for example, of the tachometer or speedometer, shows in this transitional range which extends in the case of the considered example approximately from 50 to 55 kilometers per hour, a transitional color. A solution is thereby preferred in accordance with the present invention pursuant to which the color of this transitional field or zone is composed of the colors of the adjoining indicator ranges. This may take place, for example, by cross-hatching, by dots or similar indicating characteristics.

The arrangement according to the present invention is more advantageous for the driver, especially with a speedometer, because he does not have to observe constantly the maintenance of a predetermined speed limit by hunting or falling back and forth at the speedometer between the two colors of the upper and lower indicator range but solely has to watch out for the fact that the indicator mark of the speedometer shows the color of the transitional range. If this is the case, the driver knows that he is within the tolerance limits of the prescribed speed.

Accordingly, it is an object of the present invention to provide a measuring instrument, especially a speedometer for motor vehicles which permits the driver to maintain readily a predetermined speed limit.

Another object of the present invention resides in the provision of a measuring instrument, especially speedometers for motor vehicles in which the driver, in order to maintain a predetermined speed limit, is relieved of the necessity to drive the vehicle in such a manner as to cause repeated decelerations and accelerations thereof, as would be the case normally with a conventional speed indicator when a fixed measured value is attempted to be maintained in connection therewith.

Still another object of the present invention resides in the provision of means to visually indicate to the driver compliance with prescribed speed limits without the necessity of carefully watching for any minor deviations in the speed of the vehicle falling within a tolerated range and which are caused by changes in the slope of the road, etc.

A further object of the present invention is the provision of a speed indicator for motor vehicles which permits the driver to maintain predetermined speed limits while at the same time reducing to a minimum the requirement on the part of the driver to watch the speedometer to make sure that the particular speed limit is not exceeded.

These and other objects, features and advantages of the present invention will become more obvious from the following description when taken in connection with the accompanying drawing which shows, for purposes of illustration only, one embodiment of a speed indicator in accordance with the present invention in which a roller-shaped support for the indicator mark is shown developed in the plane of the drawing.

Referring now to the drawing, wherein the sole FIGURE is a schematic view of a line indicator tachometer with the indicator window being shown in phantom section, the indicator window of the tachometer or speedometer is formed by an elongated horizontal slot 10 in the forwardly disposed covering pane or member, (not shown) i.e., in the covering pane exposed to the driver, which slot may be provided with abrupt changes in the width thereof from indicator range to indicator range.

A roller member is arranged, in a manner known per se, behind the indicator window the axis of rotation of which is parallel to the indicator window. This roller member is subdivided by an obliquely extending boundary curve 11 into a neutral field generally designated by reference numeral 12 and into an indicator field generally designated by reference numeral 13. The neutral field 12 thereby should have the color of the covering pane of the speed indicator so that it cannot be distinguished therefrom when it appears in the indicator window. The boundary curve 11 itself may be formed by a line of different color.

The indicator field 13 is subdivided again into several indicator ranges having different colors by boundary lines 14 and 14' and by boundary lines 15 and 15', extending parallelly to the axis of the roller member. The first indicator range 16 thereby has a green color and extends up to a predetermined speed value, for example, up to 50 kilometers per hour. The next indicator range 17 has an orange color and includes the speed range of between 50 to 100 kilometers per hour. The last indicator range 18 is of red color and includes speeds above 100 kilometers per hour.

Transitional color fields or zones 19 and 20 are arranged between the indicator ranges 16 and 17 and the indicator ranges 17 and 18 of different color, respectively. The transitional color field 19 is thereby located between the boundary lines 14 and 14' and is composed of the colors of the adjoining indicator ranges 16 and 17, i.e., of green and orange. This may take place by crosshatching, dotting, or similar measures. In a similar manner, the transitional color field 20 is located between the boundary lines 15 and 15' and is composed of the colors of the adjoining indicator ranges 17 and 18, i.e., of orange and red.

During rotation of the roller member which takes place in dependence on the vehicle speed, the color of the corresponding indicator range becomes visible within the indicator window 10 from the end of the scale, i.e., the zero value thereof up to the prevailing measured value. The transition from one to the other range, however, does not take place abruptly in the manner described in the aforementioned copending application but in such a manner that the transitional color field 19 or 20 appears in the window. This means that when the vehicle reaches a speed of 50 kilometers per hour, the desired color of the transitional field 19 appears within the window 10 and only upon exceeding the permissive tolerance in the upward direction, i.e., at 55 kilometers per hour, the orange color of the next indicator range becomes visible.

The present invention is predicated on the recognition that present-day driving habits are based on the desire on the part of the driver to maintain the maximum permissive speed in traffic as much as possible. As a result thereof, most drivers watch constantly the conventional speed indicators to assure maintenance of a certain indicated point which corresponds to the maximum permissive speed limit. This constitutes ordinarily a serious hazard and danger of distraction as the speed of a vehicle, for a given setting of the gas pedal, changes with changes in the grade of the road, for example, as the road changes from a flat road portion to a descent or downwardly sloping portion. The driver under these circumstances has to release the gas pedal until an equilibrium condition is attained again in which the vehicle moves near the maximum permissive speed limit. As soon as the down grade of the road decreases, the driver, in attempting to maintain a maximum speed, again steps on the gas pedal. This produces an acceleration which again has to be carefully watched so as not to exceed the permissive maximum speed. This sequence repeats itself constantly in traffic, requiring a far greater attention on the part of the driver than is desirable for safe driving, particularly as modern vehicles far exceed in their output power the need for the speed limits imposed by inadequate road capacities.

The present invention, therefore, proposes an improvement based on the fact that speed enforcing authorities normally tolerate a temporary exceeding of the speed limit within a predetermined range of tolerance. As this is the case, the attention required on the part of the driver to watch for a speed range corresponding to the tolerated range above the maximum speed is reduced by a considerable amount as compared to the attention necessary to watch carefully for a point-like condition which is subject to constant as well as sudden fluctuations. While the amount of supervision on the part of the driver is already lessened for a speedometer arrangement as disclosed in my aforementioned copending application as compared to conventional speedometers in which a needle pointer has to be carefully read in relation to a numerical scale, the sudden changes in the color field and constant fluctuations under driving conditions which are likely to occur, as pointed out hereinabove, still require a substantially greater amount of supervision on the part of the driver than is necessary with the arrangement in accordance with the present invention which therefore permits an increase in the driving safety.

While I have shown and described only one embodiment in accordance with the present invention, it is understood that the same is not limited thereto but is susceptible of many changes and modifications within the spirit and scope of the present invention, and I, therefore, do not wish to be limited to the details shown and disclosed herein but intend to cover all such changes and modifications as are encompassed by the scope of the appended claims.

I claim:
1. A measuring device, especially speed indicator for motor vehicles, having elongated window means and indicator means forming an indicator line having an end forming an indicator mark thereof, said indicator means forming said indicator line being subdivided into a plurality of indicator zones of different color corresponding to different predetermined speed ranges and into at least one transitional indicator zone located between adjoining indicator zones corresponding to the respective different predetermined speed ranges, each transitional indicator zone being substantially smaller than adjoining indicator zones corresponding to respective speed ranges, each indicator zone of different color having its color extending from a zero point of the measuring device to the predetermined speed range associated with each indicator zone, whereby said indicator mark is movable effectively in the longitudinal direction of said elongated window means and corresponding in length thereof to the speed of the vehicle.

2. A measuring device according to claim 1, wherein said transitional indicator zone is composed essentially of the colors of the adjoining speed-range indicator zones.

3. A measuring device according to claim 1, wherein said window means is provided with abrupt changes marking the passage from one speed range to the next.

4. A measuring device, especially speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line being subdivided into a plurality of indicator zones of different color corresponding to different predetermined speed ranges to thereby render visible an indicator line through said window means which changes its color from the zero point thereof to the prevailing speed in conformity with the particular speed range within which falls the prevailing indicated speed, and into at least one transitional indicator zone located between adjoining indicator zones corresponding to different predetermined speed ranges, the transitional indicator zone having a size corresponding to the given permissive range of tolerance for a given speed limit.

5. A measuring device, especially speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line being subdivided into a plurality of indicator zones of different color corresponding to different predetermined speed ranges to thereby render visible an indicator line through said window means which changes its color from the zero point thereof to the prevailing speed in conformity with the particular speed range within which falls the prevailing indicated speed, and into at least one transitional indicator zone disposed between adjoining indicator zones corresponding to different predetermined speed ranges, the transitional zone being of a color composed of the color of the two adjoining speed-range zones and having a size corresponding to the permissive range of tolerance for a given speed limit.

6. A measuring device according to claim 5, wherein said indicator window means changes its width with different speed-range indicator zones in progressive step-like increases.

7. A measuring device, especially speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line being subdivided into a plurality of indicator zones of different color corresponding to different predetermined speed ranges to thereby render visible an indicator line through said window means which changes its color from the zero point thereof to the prevailing speed in conformity with the particular speed range within which falls the prevailing indicated speed, and a transitional indicator zone disposed between adjoining indicator zones corresponding to different predetermined speed ranges, said transitional indicator zone being disposed above a desired maximum speed, said transitional indicator zone consisting of cross hatching of the colors of the two adjoining speed range zones and having a size corresponding to the permissive range of tolerance for the desired maximum speed, said size being substantially less than the sizes of the two adjoining speed range zones.

8. A measuring device, especially speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line being subdivided into a plurality of indicator zones of different color corresponding to different predetermined speed ranges to thereby render visible an indicator line through said window means which changes its color from the zero point thereof to the prevailing speed in conformity with the particular speed range within which falls the prevailing indicator speed, and a transitional indicator zone located between adjoining indicator zones corresponding to different predetermined speed ranges, the lower of the two predetermined speed ranges having an upper limit corresponding to a predetermined speed limit, said transitional indicator zone being above said predetermined speed limit, said transitional color zone having a size corresponding to a permissive range of tolerance for said predetermined speed limit.

9. A measuring device, especially speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line being subdivided into a plurality of indicator zones of different color corresponding to different predetermined speed ranges to thereby render visible an indicator line through said window means which changes its color from the zero point thereof to the prevailing speed in conformity with the particular speed range within which falls the prevailing indicated speed, and a transitional indicator zone disposed between adjoining indicator zones corresponding to different predetermined speed ranges, the transitional zone being of a color consisting of cross hatching of the colors of the two adjoining speed-range zones and having a size corresponding to the permissive range of tolerance for a given speed limit.

10. A measuring device, especially a speed indicator for motor vehicles, comprising elongated window means and indicator means forming an indicator line having an end forming an indicator mark thereof movable effectively in the longitudinal direction of said elongated window means and corresponding in length thereof to the speed of the vehicle, said indicator means forming said indicator line means subdivided into a plurality of indicator zones including first and second indicator zones of different colors corresponding to different predetermined speed ranges to thereby render visible an indicator line through said window means which changes its color from the zero point thereof to the prevailing speed in conformity with the particular speed range within which falls the prevailing indicated speed, said first indicator zone corresponding to a speed of between zero to 50 km./hr., and a transitional indicator zone located between said first indicator zone and said second indicator zone, said transitional indicator zone having a size corresponding to a permissive range of tolerance from the upper limit of said first indicator zone.

References Cited in the file of this patent
UNITED STATES PATENTS

| | | |
|---|---|---|
| 2,254,242 | Righi | Sept. 2, 1941 |
| 2,309,941 | Drummond | Feb. 2, 1943 |
| 2,802,442 | Helgeby | Aug. 13, 1957 |